United States Patent
Phipps

(10) Patent No.: US 7,090,883 B2
(45) Date of Patent: Aug. 15, 2006

(54) EDIBLE COMPOSITIONS AND METHODS OF MAKING EDIBLE COMPOSITIONS

(76) Inventor: L. Myles Phipps, 28 Franklin St., Warren, PA (US) 16365

( * ) Notice: Subject to any disclaimer, the term of this patent is extended or adjusted under 35 U.S.C. 154(b) by 260 days.

(21) Appl. No.: 10/234,311

(22) Filed: Sep. 3, 2002

(65) Prior Publication Data

US 2003/0049357 A1    Mar. 13, 2003

Related U.S. Application Data

(60) Provisional application No. 60/316,870, filed on Sep. 4, 2001.

(51) Int. Cl.
*A23L 1/236* (2006.01)
(52) U.S. Cl. ........................ 426/548; 426/573; 426/650
(58) Field of Classification Search ................ 426/548, 426/573, 650, 615, 575, 534
See application file for complete search history.

(56) References Cited

U.S. PATENT DOCUMENTS

| 4,004,040 A | 1/1977 | Puta |
| 4,849,240 A | 7/1989 | Giddey et al. |
| 5,106,644 A | 4/1992 | El-Nokaly |
| 5,447,743 A | 9/1995 | Dvir et al. |
| 5,478,589 A | 12/1995 | Jones et al. |
| 5,750,175 A | 5/1998 | Hubbell |
| 6,162,484 A | 12/2000 | Hammond |

*Primary Examiner*—Leslie Wong
(74) *Attorney, Agent, or Firm*—Wells St. John P.S.

(57) ABSTRACT

The invention includes an edible composition which contains at least one gum, a non-nutritive sweetener, at least one of glycerin and a glycol, and a flavoring agent. The composition is essentially calorie-free. The invention also includes a composition having a taste and texture like honey. The honey-like composition contains a gum, a non-nutritive sweetener, a preservative agent a flavoring agent and at least one of glycerin and a glycol. The composition additionally contains water. The invention additionally includes a method of forming a food product.

30 Claims, 1 Drawing Sheet

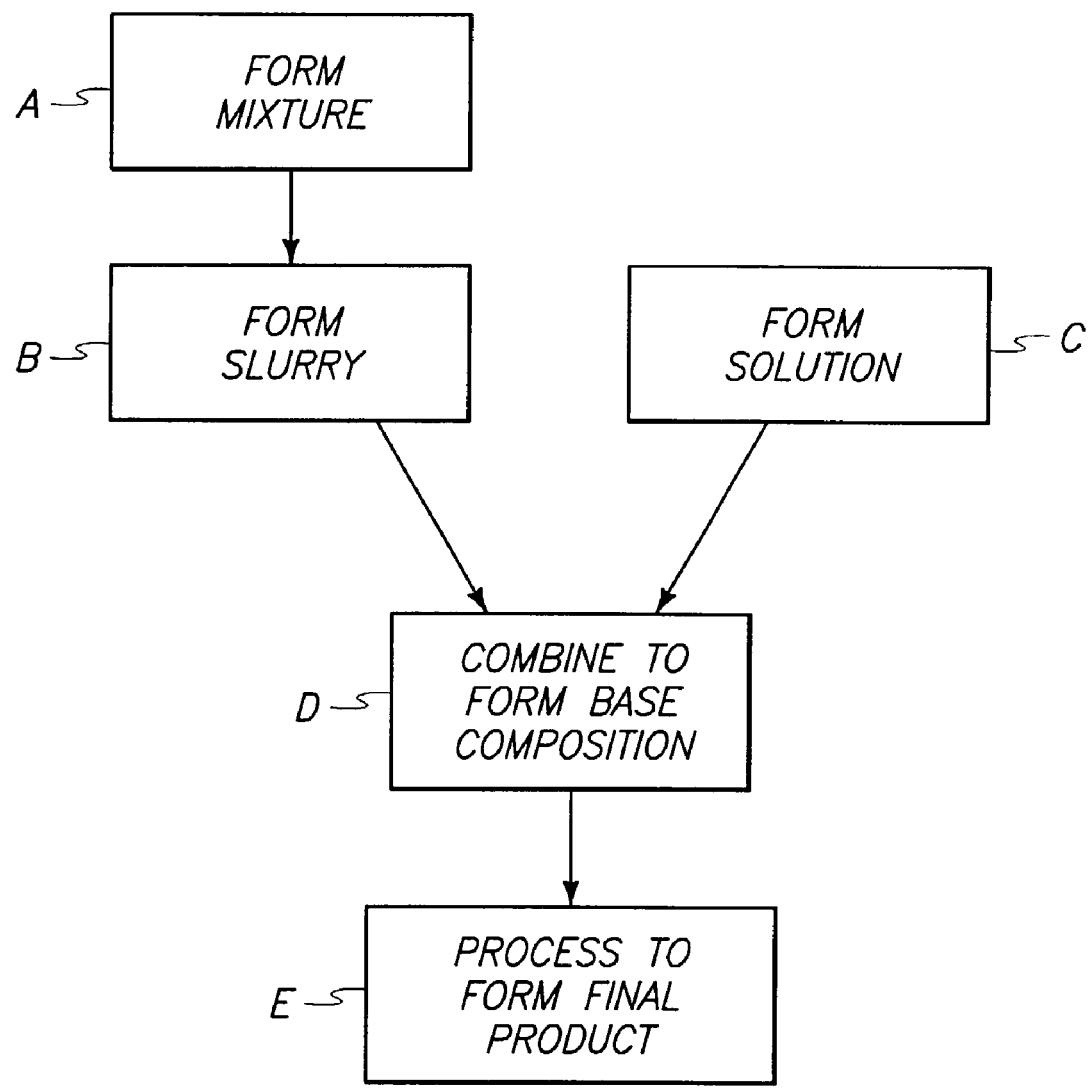

EDIBLE COMPOSITIONS AND METHODS OF MAKING EDIBLE COMPOSITIONS

RELATED PATENT DATA SECTION

This application claims priority to U.S. Provisional Application Ser. No. 60/316,870, which was filed on Sep. 4, 2001.

TECHNICAL FIELD

The invention pertains to edible compositions, honey substitutes and methods of forming edible compositions.

BACKGROUND OF THE INVENTION

Honey is a sweet, flavorful and viscous natural food product. Due to its inherent sweetness, natural honey can be utilized to sweeten other foods and beverages. However, natural honey has a very high in calorie content and honey consumption can therefore be unfavorable for persons on calorie restrictive diets. Additionally, natural honey contains proteins which are potential allergens for sensitive persons.

Attempts to produce substitute honey products or honey replacements typically involve dilution of natural honey which decreases the calorie content per volume. The dilution of honey can result in a decrease or loss in desirable properties such as sweetness, viscosity, texture, or flavor. Further, dilution of honey dilutes the calorie content but the diluted product can still retain a significantly high calorie content as to be dietetically unfavorable. Additionally, dilution of honey does not eliminate the content of potential allergens in the diluted product.

It would be desirable to develop minimal calorie compositions having honey-like characteristics and to develop other minimal or reduced calorie compositions.

SUMMARY OF THE INVENTION

In one aspect the invention encompasses an edible composition. The edible composition contains at least one gum, a non-nutritive sweetener, at least one of glycerin and a glycol, and a flavoring agent. The composition is essentially calorie-free.

In one aspect the invention encompasses a food product. The food product contains carboxymethylcellulose, and at least one of guar gum, xanthan gum, gum arabic, and algin gum. Additionally, the food product contains glycerin, one or both of sucralose and aspartame, and at least one flavoring agent.

In another aspect the invention encompasses a method of forming a food product. A mixture is formed containing two or more cellulosic gums, at least one additional gum, and glycerin. The mixture is added to an aqueous solution which contains at least one non-nutritive sweetener. The combining of the mixture and the aqueous solution forms a pourable liquid which is poured onto a surface to form a layer. The layer is then at least partially dehydrated.

BRIEF DESCRIPTION OF THE DRAWINGS

Preferred embodiments of the invention are described below with reference to the following accompanying drawings.

The FIGURE shows a flowchart diagram of a method of forming a composition according to an embodiment of the present invention.

DETAILED DESCRIPTION OF THE PREFERRED EMBODIMENTS

The invention encompasses edible compositions and methodology for forming edible compositions. A composition encompassed by the present invention can comprise a thickener system which can provide a viscosity to the composition. The thickener system can be, for example, a gum system comprising at least one gum. Exemplary gum systems can comprise one or more cellulosic gums. Numerous cellulosic gums are available for utilization in the gum system of the present invention, such as for example methylcellulose, carboxymethylcellulose (CMC), hydroxyethylcellulose, hydroxypropylcellulose, hydroxyethylmethylcellulose and hydroxypropyl-methylcellulose (HPMC). In some aspects, compositions according to the present invention can contain more than one cellulosic gum and preferably contain two or more cellulosic gums. In particular aspects of the invention, the composition comprises a combination of carboxymethylcellulose (CMC) and hydroxypropylmethylcellulose (HPMC).

The total amount of cellulosic gums contained in compositions of the present invention is not limited to a particular amount. The amount of each cellulosic provided in the composition can depend on the number, quantity and type of additional cellulosics provided, other non-cellulosic gums provided, other thickening agents provided, a desired viscosity, and a desired consistency of the product composition (discussed below). In particular embodiments, the composition can comprise equivalent amounts of two or more cellulosics, such as an equal amount of CMC relative to HPMC.

In addition or alternatively to the cellulosic gum, the gum system of the composition can comprise one or more non-cellulosic gum. Exemplary non-cellulosic gums available for purposes of the present invention include, but are not limited to, guar gum, xanthan gum, gum arabic, pectin and algin gum. It can be advantageous to utilize a gum such as gum arabic to provide soluble fiber to the composition.

In some aspects of the invention, the composition can comprise two or more cellulosic gums and at least one non-cellulosic gum. A preferred gum system can comprise CMC, HPMC and at least one of xanthan gum or gum arabic, most preferably both gum arabic and xanthan gum. The amount of non-cellulosic gum utilized in compositions of the present invention can vary depending upon the presence and amounts of other gums in the composition, the presence and amounts of other thickening agents in the composition, and the desired consistency and viscosity of the final composition.

An exemplary gum system for utilization as the thickening agent for compositions of the present invention can comprise, for example, an amount of xanthan gum that is from about 20% to about 30% of the total amount of cellulosic gums comprised in the system. For example, when a composition comprises CMC and HPMC, the amount of xanthan gum used can be from about 20% to about 30% of the combined weight of CMC and HPMC.

Premixed gum systems are commercially available which can be utilized in compositions of the present invention. Such commercially available gum systems typically comprise a plurality of gums, some of which are listed above. An exemplary premixed gum system that can be utilized in the compositions of the present invention is TICALOID® 1022, from TIC Gums, Bellcamp, Md. Commercially available gum systems can be used individually, can be combined, or can be used in combination with one or more of the gums listed above. Commercial gum systems can comprise any of the above listed gums, can comprise other or additional gums and can comprise additional viscosity agents.

In addition or alternative to the described gum systems, compositions of the present invention can comprise one or more non-gum viscosity agents, such as a protein viscosity agent. An exemplary protein viscosity agent is collagen.

The present invention includes both pourable forms and non-pourable film or layer forms of the compositions described herein. In a pourable form, compositions of the present invention can preferably have a viscosity ranging from greater than about 3000 cP to less than or equal to about 10,000 cP. The invention also contemplates pourable compositions comprising lower viscosities.

In particular embodiments of the present invention, the composition is intended to simulate natural honey or an aqueous natural honey and can preferably have a viscosity that simulates or mimics that of natural honey or aqueous natural honey. Natural honey can be highly viscous, typically having a viscosity of about 10,000 cP. An aqueous honey corresponding to approximately 92%–96% honey and 4%–8% water can typically have a viscosity of from about 3000 cP to about 3500 cP. Honey substitute compositions of the present invention can preferably have a viscosity ranging from greater than about 3000 cP to less than or equal to about 10,000 cP, and in particular aspects can comprise a viscosity of from between about 3000 cP to about 6000 cP.

In addition to the pourable compositions above, compositions according to the invention can be non-pourable and can comprise, for example,, a layer form, a film form, a molded form, or portions of a layer, film or molded form.

The thickening system can optionally contain a starch material such as a modified starch, for example a lipophilic starch. An exemplary lipophilic starch for utilization in the present invention is STA-MIST 365 produced by A. E. Staley Manufacturing Company, Decatur, Ill. The amount of starch utilized in the composition can vary depending upon the starch utilized, the types and amounts of other viscosity agents present, and the desired viscosity or texture of the composition. An exemplary amount of lipophilic starch for formation of the composition can be from about 9 percent to about 10 percent of the composition by weight.

It can be advantageous to utilize a modified starch in addition to one or more of the viscosity agents discussed above to increase the viscosity of the resulting composition and provide improved mouth feel due to a smoothness effect. It can be further advantageous to utilize a lipophilic starch in the present invention to provide a viscosity profile that is nonlinear as a function of temperature. A nonlinear viscosity profile can allow the composition to become rapidly less viscous as the temperature rises and therefore more realistically simulate honey. Alternatively, in particular embodiments it can be advantageous to omit any lipophilic starch from the composition due to the caloric contribution of starch. Additionally, it can be advantageous to omit the lipophilic starch in embodiments where a relatively translucent product is desired.

In addition to the above discussed viscosity agents, propylene glycol alginate can additionally be utilized to enhance viscosity of the composition. It can be advantageous to utilize propylene glycol alginate in compositions of the present invention since propylene glycol alginate can additionally act as a flavor enhancer (discussed below).

Compositions encompassed by the present invention can additionally comprise one or more humectants. Appropriate humectants for utilization in the present invention include, but are not limited to, one or more of glycerin and propylene glycol. It is to be understood that the invention encompasses utilizing other humectants including, for example, other glycols, diols, triols and higher order polyols. In embodiments of the present invention comprising glycerin, a weight of combined thickening agents can typically be from about 20% to about 30% by weight relative to the glycerin. In embodiments comprising both propylene glycol and glycerin, propylene glycol can be present from about 20% to bout 25% by weight relative to glycerin. It is to be noted that propylene glycol and glycerin are also sweeteners and utilization of either of these agents can contribute to the overall sweetness of the composition.

The composition can optionally comprise one or more emulsifying agent, for example lecithin.

The composition of the present invention can further comprise water, preferably de-ionized water. In embodiments of the present invention wherein the final composition is a pourable substance, the total amount of viscosity agents can typically be from about 1.2% to about 1.5% relative to the weight of water present in the composition.

Compositions of the present invention can be sweetened compositions which contain one or more sweeteners. Preferably, the composition comprises at least one non-nutritive sweetener and in particular embodiments the added sweetener consists of non-nutritive sweeteners. Numerous non-nutritive sweeteners are available for use in the present invention, including but not limited to, aspartame, acesulfame K, sucralose, stevia, a stevia related glycoside, neotame, and mixtures thereof. Compositions of the present invention are preferably low calorie or calorie-free and therefore preferably contain little or no nutritive sweeteners. It is to be understood however, that the present invention encompasses utilization of small amounts of nutritive sweeteners in combination with one or more non-nutritive sweeteners. The invention also encompasses utilization of one or more partially nutritive sweeteners such as sorbitol, mannitol or other polyols, either alone or in combination with one or more non-nutritive sweeteners.

The present invention includes compositions having a combination of two or more non-nutritive sweeteners. It can be advantageous to utilize a combination of sweeteners to provide a more complex sweetness. One exemplary combination of sweeteners can comprise a mixture of aspartame and acesulfame K, the acesulfame K being present in the composition at about 15% to about 20% of the amount of aspartame by weight. A second exemplary combination of sweeteners can comprise a mixture of aspartame and sucralose, the sucralose being present at about 15–30% of the amount of aspartame, by weight. An exemplary amount of total non-nutritive sweetener present in the composition can be from about 0.25% to about 0.3% by weight relative to a water content of the composition.

In particular aspects of the present invention, the composition can be utilized as an ingredient for cooking. For example, when the composition is a pourable substance having one or more honey-like characteristic such as texture, consistency, viscosity and flavor, it can be desirable to utilize the composition in place of honey in food preparation. When the composition of the present invention can be utilized for cooking, it can be preferable to utilize a heat stable sweetener such as sucralose which can retain its sweetness during heating processes.

Composition according to the invention can comprise water or can be essentially water free. When the composition is a pourable substance, the water content of the composition can be from about 60% to about 99%, by weight. In non-pourable forms such as a film or a layer, the composition can be dehydrated (discussed below) to contain less than or equal to about 70% water, by weight, or can be dehydrated to be essentially water free. Appropriate water content for a given composition according to the present invention can be determined by the desired consistency or viscosity of the resulting product and the amounts and types of viscosity agents utilized in the particular composition.

In addition to the ingredients discussed above, the composition can further contain one or more flavoring agent. A variety of natural and artificial flavoring agents are available for utilization in compositions of the present invention and can be, for example, an essence, an extract, a flavor oil, a nut oil, or combinations thereof. Exemplary flavors for flavoring compositions of the present invention include, but are not limited to, honey flavor, raspberry flavor, strawberry flavor, blueberry flavor, blackberry flavor, grape flavor, peach flavor, apricot flavor, watermelon flavor, melon flavor, fruit punch flavor, cranberry flavor, mango flavor, banana flavor, citrus flavor, orange flavor, lemon flavor, grapefruit flavor, cherry flavor, vanilla flavor, mocha flavor, caramel flavor, butter rum flavor, chocolate flavor, marshmallow flavor, coffee flavor, coconut flavor and butterscotch flavor.

Compositions produced according to the invention that are food products that can be used in place of honey can preferable comprise one or more honey flavor agents. The honey flavors can be artificial or natural and can be a flavor extracted from honey. It can be advantageous to provide a combination or blend of multiple honey flavors to provide an intense honey flavor which can simulate the flavor of natural honey. Additionally, one or more vanilla flavor can be utilized in combination with honey or other flavoring agents to provide an increased flavor complexity A honey-like food product according to the present invention can combine one or more additional flavors with the honey flavors. For example, one or more fruit flavors can be added to produce a honey-fruit combination. The invention also encompasses pourable compositions comprising one or more flavors in an absence of honey flavors. Further, the invention encompasses non-pourable compositions such as dehydrated film or layers flavored with one or more flavoring agent in addition to, or in the absence of, any honey flavoring.

In addition to the flavoring agents, compositions according to the invention can further contain one or more flavor enhancing agent such as, for example, monosodium glutamate or propylene glycol alginate. Compositions of the present invention that utilize a flavor enhancing agent can preferably contain propylene glycol alginate to avoid the added sodium content contribution upon utilization of monosodium glutamate. Additionally, as discussed above it can be advantageous to utilize propylene glycol alginate as a flavor enhancer since propylene glycol alginate can also contribute to the viscosity of the composition.

In aspects of the invention where the product is a non-pourable form, any of the various flavors and flavor combinations discussed above can be utilized. Additionally, a combination of flavored regions can be produced wherein a layer, for example, has a first region comprising a first flavor and a second region comprising a second flavor. Additional layer-regions can be provided having additional flavors as desired.

Both pourable and non-pourable compositions of the present invention can be formed to have a desired color and transparency. A variety of coloring agents are commercially available for utilization in the compositions of the present invention including caramel coloring, food coloring (including natural food coloring) and food coloring blends which can be used individually or as combined to produce the color desired. Alternatively, the coloring agent can comprise one or more of a natural color or caramel color. In particular embodiments wherein the composition comprises a honey-like texture, flavor, consistency or viscosity, it can be desirable to provide one or more coloring agent to impart the color of natural honey. Compositions of the present invention are not limited to any particular shade of honey coloring and can comprise any of the numerous shades of natural honey.

In addition to honey colored compositions, the present invention encompasses compositions comprising other colors. Additionally, a particular composition can be formed to have a portion of the composition comprise one color and a second portion of the composition comprise a second color. For example, a layer can be formed having a portion of the layer comprise a first color and a second portion of the layer comprise a second color.

Appropriate colors for use in compositions of the present invention can be determined based on the intended use of the product, a shape of a food product produced or a particular flavor of composition. For example, as discussed above, a honey-like product can desirably be colored to have a honey coloring. Alternatively, for instance, a grape flavored product can be desirably colored purple or a cherry flavored product can be colored red. If a final product is to comprise a particular shape, for example a cutout shape, or a molded shape (discussed below) it can be desirable to impart a particular color to the composition based on the shape. For example, if a composition comprises a molded or cutout heart shape it can be desirable to impart a pink or red color to the heart-shaped composition. It is to be understood, however, that the present invention encompasses embodiments wherein the color imparted to the composition is arbitrary.

Compositions of the present invention can optionally comprise one or more preservative agent. Appropriate preservative agents for utilization in the present invention include, but are not limited to, potassium sorbate, sodium benzoate, sorbic acid and mixtures thereof.

The compositions of the present invention are not limited to any particular pH and can comprise, for example, a pH of less than about 8. Preferably the composition comprises a pH of less than or equal to about 5 and more preferably comprises a pH of from between about 4.7 to about 4.9. It can be advantageous to provide a pH of from about 4.7 to about 4.9 to aid in resistance in bacterial growth, maintain flavor and inhibit or minimize agglomeration and settling of gum ingredients within the composition.

A desired composition pH can be achieved utilizing, for example, one or both of sodium bicarbonate and sorbic acid. It is to be understood that the invention contemplates use of alternative acid or base components for achieving the desired pH.

The invention further encompasses food products wherein the composition is combined with one or more additional edible components. The additional component can comprise an essentially non-caloric food, low calorie food, caloric food or mixtures thereof. The additional component can be combined with any of the forms of compositions discussed above. The added components can be integrally combined with the composition for example by mixing the component into the composition or by incorporating the component into a film, layer or mold comprising the composition. Alternatively, the added component can be combined with the composition as, for example, a coating, a topping or an added layer.

Numerous food substances are available for combination with the compositions of the invention. Exemplary food substance can comprise, for example, fruit, fruit portions, fruit spread, seeds, seed fragments, nuts, nut fragments, peanuts, peanut butter, grains, grain fragments, cereal, cereal fragments, potato chip fragments, corn chip fragments, rice chip fragments, and popped or puffed grain products and fragments thereof, chocolate chips, butterscotch chips and marshmallow fragments.

A method of forming compositions encompassed by the present invention is described generally with reference to the FIGURE. A mixture can be formed in an initial step (A). The mixture can comprise some or all of the viscosity agents for thickening the composition. The mixture can comprises for example, any of the viscosity agents, gum systems and combinations thereof discussed above.

Mixture formation step (A) is not limited to any particular form of the viscosity agents. In particular embodiments the viscosity agents can be provided for mixing in a dry form such as, for example, a powdered or granular form.

Mixture formation step (A) can additionally comprise an addition of propylene glycol alginate. Alternatively, propylene glycol alginate can be added in a step subsequent to mixture formation step (A).

The mixture formed in step (A) can be utilized during a slurry formation step (B). In step (B), a humectant can be combined with the mixture from step (A) to form a slurry. The humectant can be, for example, any of the examples discussed above. An exemplary slurry formation can comprise, for example, combining an amount of glycerin to the mixture from step (A). When the mixture form step (A) comprises a dry powder mixture, the dry powder mixture can typically comprise a weight of from about 15% to about 30%, relative to the weight of the glycerin. The slurry formation can optionally comprise an addition of propylene glycol, a typical amount of propylene glycol being from about 20% to about 25% by weight, relative to the amount of glycerin.

In a solution formation step (C), a solution can be formed comprising water and one or more sweetener. Sweeteners for utilization during solution formation step (C) can be, for example, any of the sweeteners or combinations of sweeteners discussed above. Solution formation step (C) can utilize a total volume of water comprised by a final composition. Alternatively, a portion of the total water volume can be added in step (C) and a remaining volume can be added in a subsequent step, for example to adjust the composition viscosity. When solution formation step (C) utilizes only a portion of the total volume of water, the portion utilized can comprise greater than or equal to about 50% of the total volume, for example about 60% of the total volume.

Solution formation step (C) can comprise stirring for an appropriate length of time to dissolve the specific types and amounts of sweeteners utilized. In aspects of the invention where the solution comprises a mixture of a granular form of aspartame and one or both of acesulfame K and sucralose, an appropriate period can be about 20 minutes. When a powdered form of aspartame is utilized, the stirring time can be from about 5 to about 10 minutes.

In accordance with the FIGURE, the slurry formed in step (B) can be combined with the solution formed in step (C) to form a base composition in step (D). Step (D) can comprise addition of the slurry to the solution or alternatively addition of the solution to the slurry. Preferably step (D) comprises combining the slurry and the solution by slow addition of the slurry into the solution over a period of time. For example, the slurry can be added to the solution at a rate of from about 5% to about 20% of the slurry volume per minute which can inhibit or prevent formation of lumps during the combining.

Step (D) can comprise stirring during the addition of the slurry to the solution. Additional stirring can be performed after the solution addition is complete to form a thoroughly mixed and smoothly blended base composition. Exemplary post-addition stirring times can be from between about 20 to about 30 minutes. Stirring can be performed with sufficient strength to mix the composition but slow enough to inhibit incorporation of air into the composition. It can be desirable to minimize incorporation of air into the composition since incorporation of air can impart a cloudy appearance. Since a cloudy appearance in a natural honey can suggest lower quality, it can be desirable to maintain a translucent appearance in product compositions intended for use as honey replacement.

Air incorporated into a composition can be overcome by an optional air removal step (not shown) to partially or entirely remove incorporated air bubbles. An exemplary method for removal of air bubbles can comprise allowing the composition to stand for a period of time to allow the incorporated air bubbles to rise to the surface. The surfaced air bubbles can then either break or can be removed by, for example, skimming. An appropriate standing period for dispersing air bubbles can be determined based on the viscosity of the composition and the length of time it takes the incorporated air bubbles to rise to the surface. Exemplary standing periods can comprise, for example, from about 4 to about 24 hours. When a transparent product is desired it can be preferable to minimize incorporation of air bubbles during the combination step (D) to minimize preparation time. It is to be understood however, that in particular embodiments an incorporation of air bubbles into the composition is not undesirable and therefore strong stirring can be performed in step (D) without the subsequent standing period. Additionally, in particular compositions air bubbles can evolve from the composition even after packaging and the standing period can be omitted.

Combination step (D) can further comprise adding a second volume of water to the composition. The second volume of water can be added to achieve a desired viscosity of the base composition.

The base composition formed in step (D) can be further processed to form a final product in step (E). It is to be understood that in particular embodiments, for example where the composition will be a food product utilized as an ingredient in cooking, additional processing step (E) can be omitted. Step (E) can comprise addition of one or more flavors, addition of one or more colors or the addition of both coloring and flavoring agents. Colors can be added independently of flavors or can be combined with flavors prior to the addition. Coloring and flavoring agents utilized in step (E) can comprise any of the agents discussed above. It can be preferable to add flavoring or coloring agents subsequent to the forming of the base composition in step (D) to minimize loss of any volatile flavoring or coloring agents during processing. It is to be understood, however, that the flavoring and coloring agents can be added during or prior to formation of the base composition in step (D).

Step (E) can further comprises an addition of one or more preservative agent. Exemplary preservative include, potassium sorbate, sodium benzoate, and sorbic acid and combinations thereof. The preservative agents can be provided in a dry form such a powder form or can be solubilized prior to addition. The preservatives can preferably be added after any coloring and flavor agents. Alternatively, one or more preservative agent can be mixed with one or more coloring and/or flavoring agent to form a solution which can then be added to the composition. It is to be understood that the invention contemplates addition of the preservatives prior to the addition of coloring or flavoring, and further contemplates addition of the preservatives in a step prior to step (E).

In particular aspects of the invention, the method depicted in the FIGURE can be utilized to form a composition that consists essentially of a gum system component, a non-nutritive sweetener component, a preservative agent, one or both of a coloring agent and a flavoring agent, at least one of glycerin and a glycol, and water. Additionally, compositions can be produced that consist essentially of at least one gum, at least one non-nutritive sweetener, one or both of a flavoring agent and a coloring agent, at least one of glycerin and a glycol and water.

Processing step (E) can optionally comprise addition of one or more starch to the composition. Numerous starches are available for utilization in step (E) and can comprises, for example the starches discussed above. In compositions of the present invention that comprise a starch such as, for example, a lipophilic starch (discussed above) it can be preferable to add the starch after formation of a base composition in step (D), either prior to or subsequent to any addition of flavoring or coloring agents. An exemplary method for addition of a lipophilic starch can comprise adding the lipophilic starch to the formulated base composition during processing step (E), and heating the composition to assist in hydration and dispersal of the starch. The composition can be heated to above about 140° F., preferably to at or above 150° F. The process of adding starch can further comprise stirring and can comprise heating and stirring times sufficient for complete hydration of the starch. An exemplary heating/stirring time can be greater than or equal to about 10 minutes.

The compositions produced by the discussed method can be essentially calorie-free, or can be low-calorie compositions. For purposes of the present description, essentially calorie-free means fewer than 5 calories per serving and low-calorie means 40 calories or less per serving. Additionally, for purposes of the present invention, a single serving is defined as approximately 21 grams of a composition wherein the composition is in a pourable form having a viscosity of at least 3000 cP.

The base composition produced in step (D) or the flavored and/or colored composition produced in step (E) can be a final food product. Alternatively, step E can comprise further processing of the base composition or flavored and or colored composition to form alternative food products. For example, a composition can be processed in step (E) by pouring or spreading the composition over a surface to form a layer. The layer can be partially or fully dehydrated to form a film or layer. Alternatively, a composition produced by the described method can be poured or spread into one or more molds and can subsequently also be partially or fully dehydrated. The described films, layers or molded forms of the compositions of the present invention can be for example, a candy-like product. Films and layers produced by the described method can optionally be cut into desired shapes or rolled to form a roll-up. A resulting roll-up can optionally be sliced into rolled segments.

Processing in step (E) can optionally comprise at least partially dehydrating a composition. Dehydrating of a composition can occur prior to, during or after addition of any additional ingredients (see below). Dehydration of a composition can comprise partial dehydration or full dehydration. For purposes of the present description, full dehydration means removal of essentially all the water from a composition. Dehydration is not limit to any specific method and can comprise, for example, one or more of heating drying, air drying, and vacuum drying.

In addition to the above described food products that consist of an essentially calorie-free or low calorie composition, the invention also encompasses embodiments comprising additional ingredients which can include caloric ingredients, low calorie ingredients or essentially non-caloric ingredients. Accordingly, processing step (E) can comprises combining additional ingredients with a composition. Exemplary additional ingredients for utilization in processing step (E) include any of the food components discussed above.

During processing step (E), added food components can be combined with a pourable composition, can be added into or onto a film or a layer comprising the composition, or can be included in or on the molded form of the composition. Exemplary methods for incorporating one or more additional ingredients to form a food product according to the present invention can comprise spreading, sprinkling or otherwise dispersing the one or more additional ingredients over a surface and pouring or spreading the composition over the additional ingredients to incorporate the additional ingredients into a film or layer. The resulting film or layer can be partially or fully dehydrated and can be subsequently cut into fragments or shapes or alternatively can be rolled to form a rollup which can optionally be sliced.

In particular aspects of the invention, one or more type of food particles or spread can be added to the composition after formation of a layer or film. Food particles can, for example, be added prior to any dehydration of the film or layer, during dehydration of the film or layer or after dehydration of the film or layer. Similarly, a food spread can be spread over a layer or film prior to, during or after dehydrating the composition.

The invention also encompasses other methods of combining food particles with the compositions of the present invention to form a resulting food product. Such additional methods can include, but are not limited to, pressing food particles into a surface of a composition and/or rolling the food particles within a layer or film comprising the composition to form a roll-up type food product which can optionally be sliced. Alternatively, the composition can be coated with the one or more added ingredients by dipping, spraying or brushing. It is to be understood that the present invention encompasses utilization of alternative toppings or methods of incorporating such toppings to form food products comprising the compositions described above.

Compositions of the present invention can optionally be pasteurized. Pasteurization can comprise high temperature, short time pasteurization; ultra high temperature, ultra short time pasteurization or other pasteurization methods. Compositions according to the present invention can additionally be packaged into appropriate packaging including, but not limited to, a jar or sealable container comprising glass, polyethylene, polypropylene, polycarbonate or other materials. Forms of the present invention can be packaged utilizing, for example, a plastic or waxed wrapper.

EXAMPLES

Example 1

Preparation of a Transparent Artificial Honey

The composition as set forth in Table 1 was prepared as follows. Items 1–5 were mixed together and combined with items 6 and 7 to form a slurry. A solution was formed by combining the majority of the water (item 13) with sweeteners 8 and 9. The solution was stirred vigorously until clear.

A base composition was formed by slow addition of the slurry to the solution while stirring. Stirring was continued until the base composition was homogenous and smooth. The remainder of the water (item 13), honey flavors, vanilla flavor and coloring agents were added to the base composition to form the product composition.

TABLE 1

Honey-Substitute Composition No. 1

| | Component | % of Product (by weight) |
|---|---|---|
| 1 | High viscosity carboxymethylcellulose gum (CMC-3000, Coyote Gums; Tucson, AZ) | 0.500 |
| 2 | High viscosity hydroxypropylmethylcellulose gum (METHOCEL ® K100M; Dow, Midland MI) | 0.500 |
| 3 | Xanthan Gum | 0.223 |
| 4 | Propylene Glycol Alginate | 0.0525 |
| 5 | Sodium Bicarbonate | 0.131 |
| 6 | Glycerin | 5.91 |
| 7 | Propylene Glycol | 1.31 |
| 8 | Aspartame (powder or granules) | 0.223 |
| 9 | Acesulfame K | 0.0421 |
| 10 | Food color Blend (pre-dissolved volume ratio 40 Yellow:4 Green:12 green (MCCORMICK ® McCormick & Co., Wilmington DE)). | 0.237 |
| 11 | Honey Flavors | 0.17 |
| 12 | Vanilla Extract | 0.0657 |
| 13 | Water | 90.7 |

The product composition set forth in Table 1 is a transparent pourable honey-like substance. The product is low calorie, having approximately 5.3 calories per 21 grams of product.

Example 2

Preparation of a Non-Transparent Artificial Honey

TABLE 2

Honey-Substitute Composition No. 2

| | Component | % of Product (by weight) |
|---|---|---|
| 1 | High viscosity carboxymethylcellulose gum (CMC-3000, Coyote Gums; Tucson, AZ) | 0.455 |
| 2 | High viscosity hydroxypropylmethylcellulose gum (METHOCEL ® K100M; Dow, Midland MI) | 0.455 |
| 3 | Xanthan Gum | 0.203 |
| 4 | Propylene Glycol Alginate | 0.0477 |
| 5 | Sodium Bicarbonate | 0.119 |
| 6 | Glycerin | 5.37 |
| 7 | Propylene Glycol | 1.19 |
| 8 | Aspartame (powder or granules) | 0.203 |
| 9 | Acesulfame K | 0.0382 |
| 10 | Food color Blend (pre-dissolved volume ratio 40 Yellow:5 Green:12 green (MCCORMICK ® McCormick & Co., Wilmington DE)). | 0.215 |
| 11 | Honey Flavors | 0.155 |
| 12 | Vanilla Extract | 0.0597 |
| 13 | Water | 82.5 |
| 14 | Lipophilic Starch (STA-MIST ®, AE Staley Manufacturing Co., Decatur IL) | 9.1 |

A honey-substitute composition having the contents set forth in Table 2 was prepared. Components 1–13 listed in Table 2 were combined following the order and process indicated in Example 1 (above). Subsequently, the lipophilic starch (component 14) was added. The addition of the lipophilic starch included heating the composition containing components 1–13 and, while stirring, adding the lipophilic starch to the heated composition. The temperature was then maintained at approximately 150° F. until the starch was fully hydrated and dispersed within the composition.

The product composition set forth in Table 2 is a pourable honey-like substance having a higher viscosity and less transparency relative to the composition set forth in Table 1 (Example 1 above). The Example 2 product is a low-calorie food product, having approximately 12–13 calories per 21 grams of product Example 3

Preparation of an Additional Honey-Like Composition

TABLE 3

Honey-Substitute Composition No. 3

| | Component | % of Product (by weight) |
|---|---|---|
| 1 | Pre-mixed Gum System (TICALOID ® 1022, TIC Gums; Belicamp, MD) | 1.300 |
| 2 | Gum Arabic | 0.305 |
| 3 | Glycerin | 8.73 |
| 4 | Aspartame (powder or granules) | 0.203 |
| 5 | Sucralose | 0.0508 |
| 6 | Food color Blend (pre-dissolved volume ratio 40 Yellow:4 Green:12 green (MCCORMICK ® McCormick & Co., Wilmington DE)). | 0.094 |
| 7 | Natural and Artificial Honey Flavor Blend | 0.224 |
| 8 | Potassium Sorbate | 0.090 |
| 9 | Sodium Benzoate | 0.090 |
| 10 | Sorbic Acid | 0.12 |
| 11 | Water | 88.8 |

The composition as set forth in Table 3 was prepared as follows. Items 1 and 2 were mixed together and combined with item 3 to form a slurry. An independent solution was formed by combining the water (item 11) with sweeteners 4 and 5. The solution was stirred vigorously until clear. A base composition was formed by slow addition of the slurry to the solution while stirring. The honey flavors (item 7) and coloring agents (item 6) were combined and added to the base composition, followed by addition of preservative agents (items 8–10).

The product composition set forth in Table 3 is a pourable honey-like substance having a viscosity of about 4700 cP and a pH of from about 4.7 to about 4.9. The product is low calorie, having approximately 8 calories per 21 grams of product.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A composition comprising:
   at least one gum;
   a non-nutritive sweetener;
   at least one of glycerin and a glycol; and a flavoring agent, the composition being essentially calorie-free, being free of nutritive sweeteners, and having a viscosity of from about 3000 centipoises to about 10,000 centipoises.

2. The composition of claim 1 wherein the at least one gum comprises a cellulosic compound.

3. The composition of claim 2 wherein the cellulosic compound is selected from the group consisting of methylcellulose, carboxymethylcellulose, hydroxyethylcellulose, hydroxypropylcellulose, hydroxyethylmethylcellulose and hydroxypropylmethylcellulose.

4. The composition of claim 1 wherein the at least one gum comprises carboxymethylcellulose and hydroxypropylmethylcellulose.

5. The composition of claim 4 wherein composition comprises an equal weight of carboxymethylcellulose relative to hydroxypropylmethylcellulose.

6. The composition of claim 1 wherein the at least one gum comprises a member of the group consisting of guar gum, xanthan gum, gum arabic and algin gum.

7. The composition of claim 1 wherein the non-nutritive sweetener is selected from the group consisting of aspartame, acesulfame K and sucralose.

8. The composition of claim 1 wherein the glycol comprises propylene glycol.

9. The composition of claim 1 wherein the flavoring agent comprises at least one of an essence, an extract, a flavor oil and a nut oil.

10. The composition of claim 1 wherein the flavoring agent comprises at least one flavor selected from the group consisting of honey flavor, raspberry flavor, strawberry flavor, blueberry flavor, blackberry flavor, grape flavor, peach flavor, watermelon flavor, apricot flavor, melon flavor, fruit punch flavor, cranberry flavor, mango flavor, banana flavor, citrus flavor, orange flavor, lemon flavor, grapefruit flavor, cherry flavor, vanilla flavor, mocha flavor, caramel flavor, butter rum flavor, chocolate flavor, marshmallow flavor, coffee flavor, coconut flavor and butterscotch flavor.

11. The composition of claim 1 further comprising water, the water being present in the composition from about 60% to about 99% water, by weight.

12. The composition of claim 1 wherein the composition is a pourable liquid.

13. The composition of claim 1 comprising a viscosity of from about 3000 cP to about 6000 cP at about 25° C.

14. The composition of claim 1 further comprising water, the water content being less than about 50% by volume relative to a total composition volume.

15. The composition of claim 1 having a pH less than or equal to about 5.

16. The composition of claim 15 wherein the pH is from about 4.7 to about 4.9.

17. The composition of claim 1 further comprising at least one of potassium sorbate, sorbic acid and sodium benzoate.

18. The composition of claim 1 wherein the composition is a film.

19. A food product comprising the composition of claim 18 and a topping over the film, the topping comprising at least one member of the group consisting of a fruit, fruit portions, seeds, seed fragments, nuts, nut fragments, grains, grain fragments, cereal, cereal fragments, potato chip fragments, marshmallow fragments, corn chip fragments, and chocolate chips.

20. The food product of claim 19 wherein the topping is adhered to the film.

21. The composition of claim 18 wherein the film comprises a cut-out shape.

22. A food product consisting of:
carboxymethylcellulose;
hydroxypropylmethylcellulose;
at least one gum selected from the group consisting of guar gum, xanthan gum, gum arabic and algin gum;
glycerin;
at least one member of the group consisting of propylene glycol, propylene glycol alginate, sodium bicarbonate, potassium sorbate, sodium benzoate, sorbic acid, vanilla extract, coloring agents, and lipophilic starch;
at least one sweetener selected from the group consisting of sucralose, acesulfame K, stevia, neotame, and aspartame;
at least one flavoring agent; and
from 0% to 99% water, by weight.

23. The food product of claim 22 comprising water.

24. The food product of claim 23 wherein the food product has a weight and wherein the water contributes at least about 80% of the weight.

25. The food product of claim 23 wherein the food product has a weight and wherein the water contributes from about 60% to about 80% of the weight.

26. The food product of claim 22 comprising a lipophilic starch.

27. An edible non-honey based composition comprising:
at least one viscosity agent;
at least one humectant;
sucralose;
aspartame;
at least one honey flavor;
at least one coloring agent; and
less than 70% water, by weight, the composition being free of honey.

28. The composition of claim 27 wherein the at least one viscosity agent comprises gelatin.

29. The composition of claim 28 wherein the at least one viscosity agent further comprises at least one gum.

30. The composition of claim 27 wherein the composition is essentially water free.

* * * * *